No. 722,822. PATENTED MAR. 17, 1903.
H. J. DOUGHTY.
MECHANISM FOR MANUFACTURING RUBBER SHOES.
APPLICATION FILED SEPT. 16, 1901.
NO MODEL. 3 SHEETS—SHEET 1.
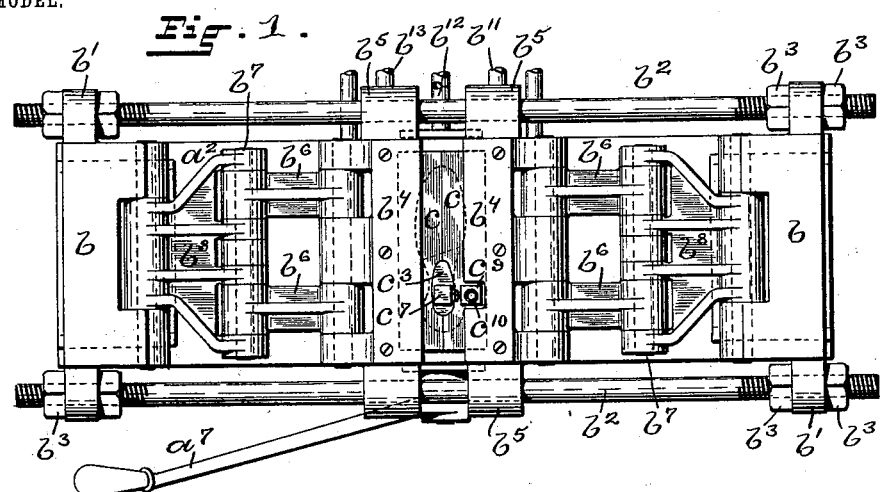
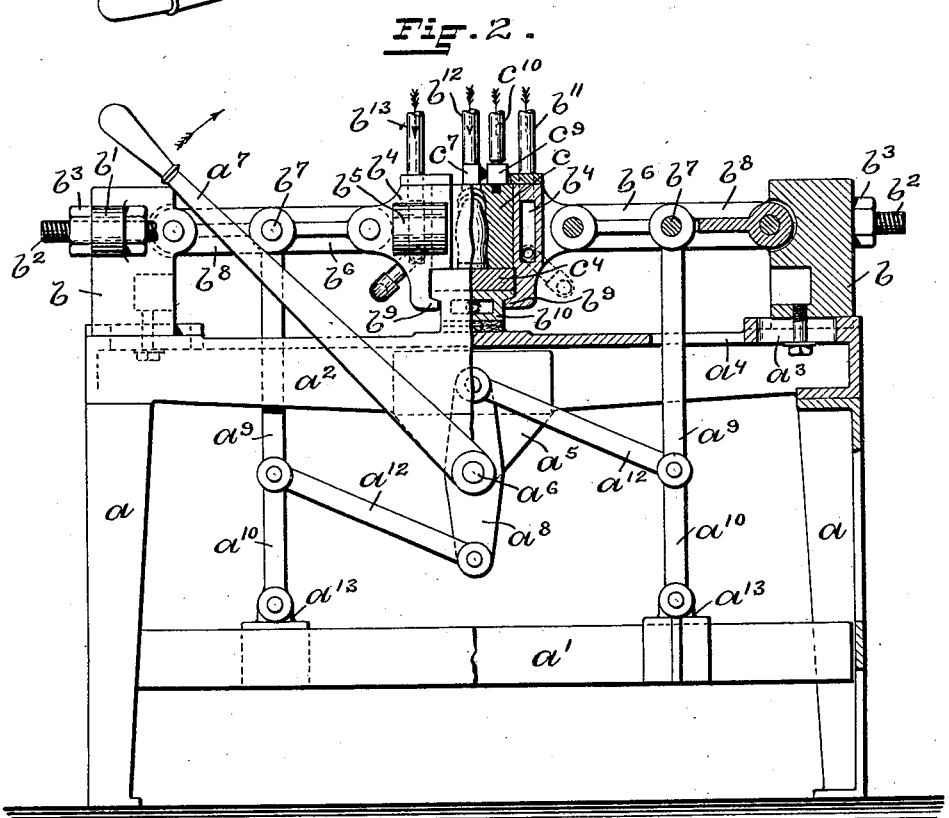
WITNESSES: INVENTOR:
Chas. H. Luther Jr. Henry J. Doughty
B. W. Simms By Joseph A. Miller & Co.
ATTORNEYS No. 722,822. PATENTED MAR. 17, 1903.
H. J. DOUGHTY.
MECHANISM FOR MANUFACTURING RUBBER SHOES.
APPLICATION FILED SEPT. 16, 1901.
NO MODEL. 3 SHEETS—SHEET 2.

WITNESSES:
Chas. H. Luther Jr.
B. M. Simms

INVENTOR:
Henry J. Doughty
per Joseph A. Miller & Co.
ATTORNEYS.

No. 722,822. PATENTED MAR. 17, 1903.
H. J. DOUGHTY.
MECHANISM FOR MANUFACTURING RUBBER SHOES.
APPLICATION FILED SEPT. 16, 1901.
NO MODEL. 3 SHEETS—SHEET 3.

WITNESSES:
Chas. H. Luther Jr
B. M. Simms

INVENTOR:
Henry J. Doughty
by Joseph C. Miller & Co
ATTORNEYS:

UNITED STATES PATENT OFFICE.

HENRY J. DOUGHTY, OF PROVIDENCE, RHODE ISLAND, ASSIGNOR TO ATLANTIC RUBBER SHOE COMPANY, OF TRENTON, NEW JERSEY, A CORPORATION OF NEW JERSEY.

MECHANISM FOR MANUFACTURING RUBBER SHOES.

SPECIFICATION forming part of Letters Patent No. 722,822, dated March 17, 1903.

Application filed September 16, 1901. Serial No. 75,448. (No model.)

*To all whom it may concern:*

Be it known that I, HENRY J. DOUGHTY, a citizen of the United States, residing at Providence, in the county of Providence and State of Rhode Island, have invented a new and useful Improvement in Mechanism for Manufacturing Rubber Shoes, of which the following is a specification.

This invention has reference to an improvement in an apparatus for molding and vulcanizing rubber boots or shoes, and is particularly applicable to the production of rubber shoes.

The object of the invention is to facilitate the manufacture of rubber shoes and to produce a better quality of shoes at less cost.

The invention consists in the peculiar and novel construction of the mechanism and the combination of the parts, more fully described hereinafter.

In describing the means used by me in carrying out my invention I have illustrated and will describe the apparatus used by me in the manufacture of rubber shoes. By changes in the forms of the molds and the work-supports the same apparatus may be used in the manufacture of rubber boots.

In carrying out my invention I employ a four-part mold having when closed the form and configuration of the outer surface of the desired rubber shoe. I employ a compound toggle-lever mechanism for operating three parts of the mold and support the fourth part of the mold on a yielding support. Three parts of the mold are provided with chambers supplied, preferably, with steam, and the fourth part of the mold is connected with a pipe supplying air, steam, gas, or other fluid and forms the support of the shoe to be molded and vulcanized.

Figure 3:
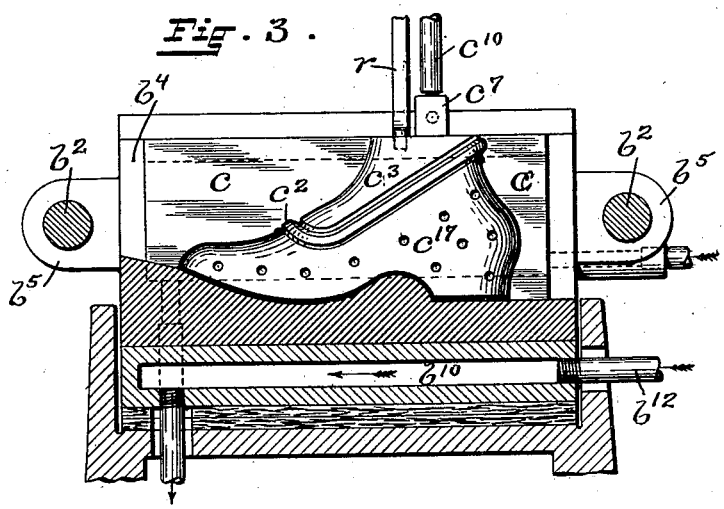
Figure 4:
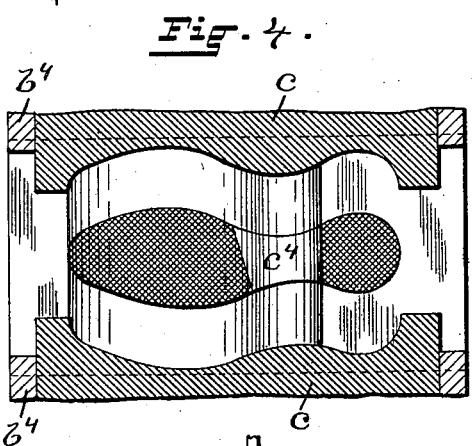
Figure 5:
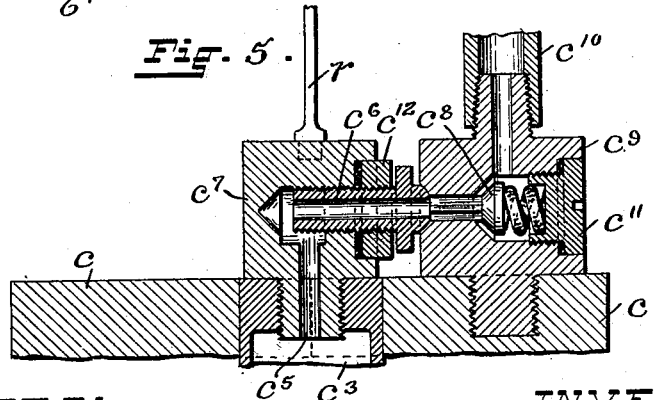
Figure 6:
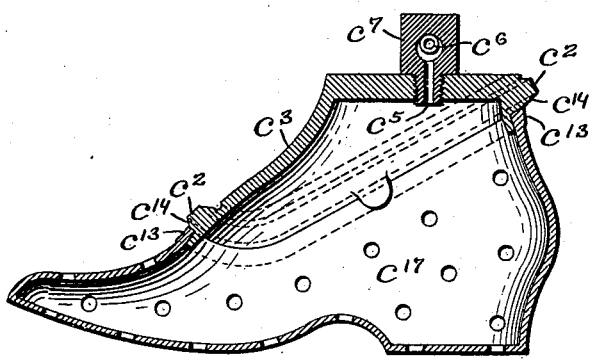
Figure 7:
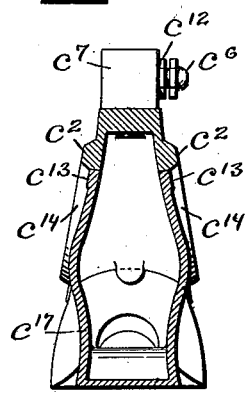
Figure 8:
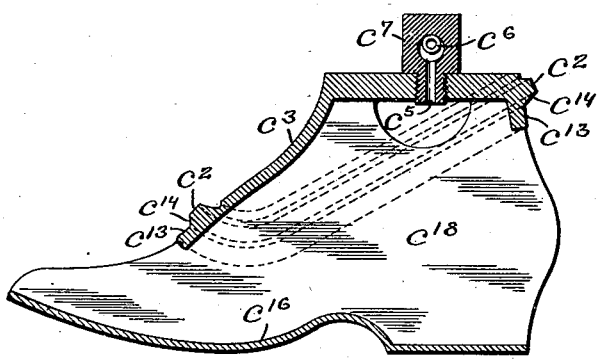
Figure 9:
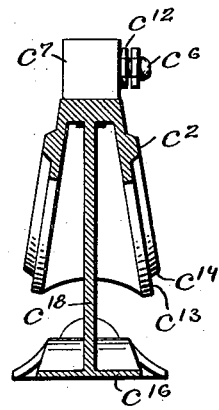
Figure 10:
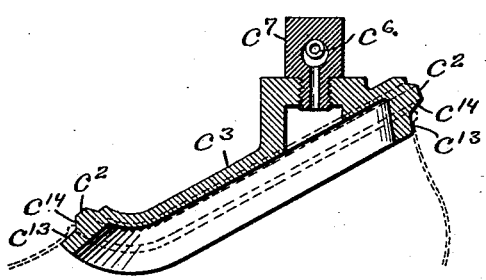
Figure 11:
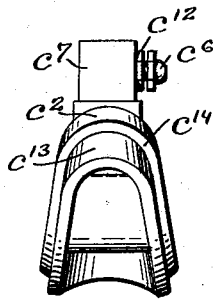

Figure 1 is a top view of my improved mechanism, showing the parts in the position when the mold is closed and a shoe is being molded. Fig. 2 is an elevation showing a front view of the machine on the left half of the figure and a vertical sectional view on the right half of the figure. Fig. 3 is a transverse sectional view of the four-part mold, showing one form of the work-support connected with the yieldingly-supported fourth part of the mold. Fig. 4 is a horizontal sectional view of the mold, showing the mold open and the third or sole part of the mold in view. Fig. 5 is a sectional view of the upper part of the mold, showing the yieldingly-supported part of the mold connected with the air or fluid supply. Fig. 6 is a sectional view of the yieldingly-supported part of the mold provided with a perforated work-support having practically the form of the shoe. Fig. 7 is a sectional view of the same parts as shown in Fig. 6, taken at right angle to the former. Fig. 8 is a sectional view of the yieldingly-supported part of the mold provided with a modified form of work-support. Fig. 9 is a sectional view at a right angle to Fig. 8. Fig. 10 is a sectional view of the yieldingly-supported part of the mold, showing the shoe connected thereto. Fig. 11 is an end view of the part of the mold shown in Fig. 10.

Similar marks of reference indicate corresponding parts in all the figures.

In the drawings, $a\,a$ indicate the end frames of the machine, forming the support of the improved mechanism for manufacturing rubber shoes, $a'$ a substantial strut secured to the end frames, and $a^2$ the top plate or table secured to the end frames. This table is provided near each end with the slots $a^3$ and $a^4$. The table $a^2$ is provided with the brackets $a^5$, one on each side, which form the journal-supports for the shaft $a^6$, on which the hand-lever $a^7$ and the double-ended arm $a^8$ are secured.

The abutments $b\,b$ are secured to the table $a^2$ by bolts extending through the slots $a^3$, as is shown in Fig. 2, and may be adjusted on the table. The abutments $b\,b$ are provided with the lugs $b'\,b'$. The rods $b^2\,b^2$ extend through the lugs $b'\,b'$ on the front and the rear of the machine. The rods $b^2\,b^2$ are screw-threaded at their ends and are rigidly secured to the abutments by the nuts $b^3\,b^3$, bearing on the opposite sides of the lugs $b'\,b'$. The chambered blocks $b^4\,b^4$ are provided at their ends with the lugs $b^5$, through which the rods $b^2\,b^2$ extend, the rods forming the supports of the blocks and the ways on which the blocks slide. The levers $b^6\,b^6$ are pivotally secured to the blocks $b^4$ and are connected by the shaft $b^7$ with the lever-frame $b^8$, pivotally secured to the abutments $b\,b$. The levers $b^6$ and lever-frames $b^8$ are secured to the blocks $b^4$ $b^4$ and to the abutments $b$ $b$ on the horizontal plane of the rods $b^2$ $b^2$, so that the thrusts of these levers are exerted on the abutments on the plane of and resisted by the rods $b^2$ $b^2$. The blocks $b^4$ $b^4$ are provided with the ribs $b^9$, the projecting upper surface of which is beveled and engages with the beveled ribs on the sides of the chambered block $b^{10}$. The chambers in the blocks $b^4$ $b^4$ and $b^{10}$ are connected with the steam-pipes $b^{11}$, $b^{12}$, and $b^{13}$ and are supplied by steam.

The two side molds $c$ $c$ are detachably secured to the blocks $b^4$ $b^4$ and have their inner faces formed to correspond with the surfaces of the two sides of the shoe and to fit on the rib $c^2$ of the work-support $c^3$. The sole-mold $c^4$ is detachably secured to the chambered block $b^{10}$. The work-support $c^3$ has the duct $c^5$, terminating in a chamber. The tube $c^6$, in screw-thread engagement with the block $c^7$, extends horizontally and bears, when the mold is closed, on the stem of the spring-pressed check-valve $c^8$ in the block $c^9$, preferably secured to the side mold $c$ and connected with the air-pipe $c^{10}$.

Referring to Fig. 5, the plug $c^{11}$, in screw-thread engagement with the block $c^9$, permits of the spring adjustment of the check-valve $c^8$ and gives access to the valve. The lock-nut $c^{12}$ is set into a recess in the block $c^7$ and bears on an elastic packing, and the tube $c^6$ is in screw-thread engagement with the lock-nut. By this construction the tube may be accurately adjusted to operate the check-valve $c^8$. The work-support $c^3$ is supported by means of the rod $r$, which is of such length as will permit the mold to adjust itself to the two side molds $c$ $c$, as is desired, and operate the check-valve.

The machine is preferably operated by the toggle-jointed levers $a^9$ and $a^{10}$, the toggle-joints of which are connected by the links $a^{12}$, each to one end of the arm $a^8$. The levers $a^9$ are connected to the shafts $b^7$ $b^7$ and the levers $a^{10}$ $a^{10}$ to the thrust-blocks $a^{13}$ $a^{13}$. The lever arrangement is shown in Fig. 2 in the locked position, all the toggle-jointed levers having the toggle-joints in a straight line with the pivoted ends of the levers, in which position the toggle-jointed levers exert the greatest force and resist endwise pressure. One movement of the hand-lever $a^7$ in the direction of the arrow draws the side molds apart, and by reason of the beveled surfaces of the ribs $b^9$, formed on the side molds to correspond with the beveled surfaces on the block $b^{10}$ to which the sole-mold is secured, allows the block $b^{10}$, and with it the sole-mold $c^4$, to drop. The return movement of the hand-lever to the position shown closes the side molds, connects the work-support with the air, and by reason of the beveled surfaces of the ribs $b^9$ on the side molds and the beveled surfaces on the block $b^{10}$ lifts the block $b^{10}$, and with it the sole-mold $c^4$, into position. The operator has only to connect the shoe to the work-support $c^3$ and move the hand-lever to close the two side molds upon the shoe and work-support.

Rubber shoes are designed and almost exclusively used as overshoes. The parts subjected to the greatest strains and wear are the portions inclosing the mouth of the shoe and the sole. The more yielding and soft the rest of the shoe forming the uppers is the better it fits the shoe and the more readily the rubber shoe yields to the movement of the shoe-clad foot. I have constructed a number of work-supports adapted for different weights and qualities of rubber shoes. Figs. 6 and 7 show the work-support $c^3$ provided with a preferably-detachable perforated last $c^{17}$. Figs. 8 and 9 show the work-support $c^3$ provided with a sole-plate $c^{16}$, connected to the work-support by the rib $c^{18}$, and for certain qualities of shoes the work-support $c^3$ (shown in Figs. 10 and 11) is used by itself, without any sole-plate or other attachment. The surface $c^{13}$ extends around the work-support and receives the portion of the rubber shoe extending around the opening or mouth of the shoe. The surface $c^{14}$ on the work-support enters and closely fits the side molds $c$ $c$. When the perforated last $c^{17}$ is used in connection with the work-support, the shoe to be molded and vulcanized loosely fits over the perforated last $c^{17}$. When the shoe placed on this perforated last and work-support is inserted and the mold closed, the unyielding and heated metal surface of the side molds $c$ $c$ bears on and compresses the portion of the rubber shoe inclosing the mouth of the shoe and supported on the surface $c^{13}$ of the work-support, while the surface $c^{14}$ bears tightly on the side molds, so that the rubber inclosing the mouth of the shoe makes a tight joint. The air under pressure enters the work-support and the last through the duct $c^5$ and passing through the perforations acts on the inside of the rubber shoe and presses the outer surfaces of the shoe into contact with the rigid heated surfaces of the side molds and the sole-mold $c^4$. The whole shoe is thus molded and vulcanized. It receives the shape and finish of the highly-finished molds. The portion inclosing the mouth of the shoe being vulcanized while subjected to greater pressure between unyielding surfaces becomes somewhat more rigid, tougher, and stronger than the rest of the shoe subjected to air-pressure. The perforated last when used with the work-support has the advantage of supporting the green shoe. Permitting the air to act on all parts of the shoe it prevents wrinkles and does not strain the rubber, as a solid last is liable to do. To produce a more durable rubber shoe, I compress the sole of the shoe between two metal surfaces during the process of molding and vulcanizing the shoe. To secure this result, I use the work-support shown in Figs. 8 and 9, in which the rib $c^{18}$ extends from the work-support $c^3$ to the sole-plate $c^{16}$. This plate has the configuration of the inside of the sole of the finished shoe and acts to compress the rubber or rubber-impregnated material of the sole between the sole-plate $c^{16}$ and the sole-mold $c^4$ during the vulcanizing process. The margin of the shoe surrounding the mouth of the shoe is also strengthened by compression between the surface $c^{13}$ on the shoe-support and the mold. The work-support $c^3$, provided with the surfaces $c^{13}$ and $c^{14}$, as shown in Figs. 10 and 11, may be used to support and expand the green shoe during the process of molding and vulcanizing the shoe. By securing the margin surrounding the mouth of the shoe on the surface $c^{13}$ the shoe is expanded. As soon as the mold is closed the side molds compress the margin and form a tight joint. The compressed air entering the shoe presses all parts below the margin against the surfaces of the side molds and the sole-mold, giving to the material of the shoe the form of the molds and setting the forms by the heat of the molds vulcanizing the rubber. By regulating the air-pressure any degree of compressure of the uppers may be secured, while the sole and the margin around the mouth of the shoe may be compressed by the molds to secure the desired strength and rigidity. A rubber shoe having soft yielding uppers, a more rigid sole, and compressed margin around the mouth of the shoe can be more conveniently put on over the shoe-clad foot and more readily removed. It fits the uppers of the shoe better and may be made materially lighter than rubber shoes as heretofore made.

I do not wish to confine myself to the exact construction of the various parts of the mechanism as herein shown and described, as these may be modified or changed without materially affecting my invention.

Having thus described my invention, I claim as new and desire to secure by Letters Patent—

1. A mold for making rubber shoes by interior pressure, consisting of outer movable parts and an interior part forming a work-support and provided with an air-inlet and adapted to coöperate with the outer parts to compress the work and form an air-tight joint, as described.

2. A mold for molding and vulcanizing rubber shoes having one part of the mold formed to receive the margin around the mouth of the shoe and provided with an air-inlet, whereby the shoe may be supported in the expanded condition, as described.

3. In an organized mechanism for manufacturing rubber shoes, the combination with a sole-mold, two side molds for forming the sides and uppers of the shoe and a work-support, of means for moving the side molds in opposite directions to open the top of the mold and facilitate the insertion of the work, as described.

4. In an organized mechanism for manufacturing rubber shoes, the combination with the four-part mold, abutments adjustably secured to the frame and rods connecting the abutments and forming the sliding supports of the two sides of the mold, of the toggle-jointed lever mechanism and hand-lever whereby the mold may be opened or closed by one movement of the hand-lever, as described.

5. In an organized mechanism for manufacturing rubber shoes, the combination with the work-support, the sides of the mold and the sole-mold, of the chambered side blocks, the chambered block supporting the sole-mold, of means for operating the side blocks and lifting the sole-block, as described.

6. In a mold for molding and vulcanizing rubber shoes, the combination with a work-support and a surface on the work-support coöperating with parts of the mold to compress a part of the rubber shoe between unyielding surfaces, of an air-supply connected with the work-support, whereby part of the rubber shoe may be subjected to pressure between rigid surfaces and part to the elastic air-pressure, as described.

7. The combination with the work-support $c^3$, the air-inlet duct $c^5$ and the surfaces $c^{13}$ and $c^{14}$, of the side molds $c$ $c$, surfaces on the side molds corresponding with the surfaces $c^{13}$ and $c^{14}$ on the work-support, whereby the margin of the shoe around the mouth of the shoe is clamped between the rigid surfaces and air under pressure may be forced into the shoe, as described.

8. In combination with the work-support $c^3$, the side molds and the sole-mold, of the chambered blocks $b^4$ $b^4$, the ribs $b^9$ $b^9$ on the blocks, the chambered block $b^{10}$ and the beveled ribs on the same, whereby the closing of the side molds acts to raise the sole-mold, as described.

9. In a mold for forming rubber shoes by interior pressure, an inside part forming an air-inlet, a margin to support the work and provided with the surfaces $c^{13}$ and $c^{14}$, as described.

10. The combination with the work-support $c^3$ and the surfaces $c^{13}$ and $c^{14}$ on the same, of the rib $c^{18}$ and the sole-plate $c^{16}$, whereby parts of the shoe may be pressed between the rigid part of the work-support and the mold, as described.

11. In a mold for forming rubber shoes by interior pressure, an inside part consisting of a perforated hollow last having an air-inlet, as described.

In testimony whereof I have signed my name to this specification in the presence of two subscribing witnesses.

HENRY J. DOUGHTY.

Witnesses:
 B. M. SIMMS,
 JOSEPH A. MILLER.